US011899978B2

(12) United States Patent
Singh et al.

(10) Patent No.: US 11,899,978 B2
(45) Date of Patent: Feb. 13, 2024

(54) METHOD AND SYSTEM TO ABORT A COMMAND FOR PCIE BASED NON-VOLATILE MEMORY EXPRESS SOLID-STATE DRIVE

(71) Applicant: SAMSUNG ELECTRONICS CO., LTD., Suwon-si (KR)

(72) Inventors: Abhinav Kumar Singh, Karnataka (IN); Chandrashekar Tandavapura Jagadish, Karnataka (IN); Vikram Singh, San Jose, CA (US); Srinivasa Raju Nadakuditi, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/708,390

(22) Filed: Mar. 30, 2022

(65) Prior Publication Data

US 2023/0176785 A1 Jun. 8, 2023

(30) Foreign Application Priority Data

Dec. 6, 2021 (IN) .............................. 202141056462

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0604; G06F 3/0659; G06F 3/0679; G06F 3/0605; G06F 3/0611
See application file for complete search history.

(56) References Cited

U.S. PATENT DOCUMENTS

| 9,052,835 | B1 | 6/2015 | Darrington et al. |
| 9,582,341 | B2 | 2/2017 | Lee et al. |
| 9,996,262 | B1 | 6/2018 | Nemawarkar et al. |
| 10,355,828 | B2 | 7/2019 | Vajapeyam et al. |

(Continued)

OTHER PUBLICATIONS

Anonymous: "NVM Express Base Specification Revision 1.4a", Mar. 9, 2020, pp. 1-405, XP055878018.

(Continued)

*Primary Examiner* — Jane W Benner
(74) *Attorney, Agent, or Firm* — F. Chau & Associates, LLC

(57) ABSTRACT

A method for aborting a command for PCIe based NVMe SSD includes receiving an abort command in an Admin submission queue to abort a target command present in an I/O submission queue of host or in an I/O queue of the NVMe SSD and updating a tail doorbell of NVMe doorbell registers of the NVMe SSD after receiving the abort command. The abort command includes a slot of the target command to be aborted. Thereafter, the method includes placing the abort command into an Admin queue of the NVMe SSD and executing the abort command using the slot of the target command to be aborted by updating an I/O completion queue of the host with the target command to be aborted. The method further includes updating a head doorbell of the doorbell registers of the NVMe SSD and updating the abort command in an Admin completion queue of the host.

19 Claims, 15 Drawing Sheets

(56) References Cited

U.S. PATENT DOCUMENTS

| | | | |
|---|---|---|---|
| 2015/0324243 A1* | 11/2015 | Lee | G06F 9/54 |
| | | | 719/314 |
| 2019/0303024 A1* | 10/2019 | Iwai | G06F 3/061 |
| 2019/0317696 A1 | 10/2019 | Jagadish et al. | |
| 2020/0050402 A1 | 2/2020 | Furey et al. | |
| 2020/0097422 A1* | 3/2020 | Benisty | G06F 13/1668 |
| 2023/0126265 A1* | 4/2023 | Zinger | G06F 13/1668 |
| | | | 710/107 |

OTHER PUBLICATIONS

EESR dated Apr. 20, 2023 in corresponding Application No. EP Patent Application No. 22202311.1.
Office Action dated Nov. 7, 2023, in corresponding Indian Patent Application No. 202141056462.

* cited by examiner

METHOD AND SYSTEM TO ABORT A COMMAND FOR PCIE BASED NON-VOLATILE MEMORY EXPRESS SOLID-STATE DRIVE

CROSS-REFERENCE TO RELATED APPLICATIONS

This U.S. patent application claims priority under 35 U.S.C. § 119 to Indian Patent Application No. 202141056462 filed on Dec. 6, 2021 in the Indian Intellectual Property Office, the disclosure of which are incorporated by reference in its entirety herein.

TECHNICAL FIELD

The present disclosure relates in general to the field of data transmission, and more particularly to a method for controlling a Peripheral Component Interconnect express (PCIe) based Non-Volatile Memory express (NVMe) Solid-State Drive (SSD) and a system performing the method.

DISCUSSION OF RELATED ART

Non-Volatile Memory express (NVMe) is an open, logical-device interface specification for accessing a non-volatile storage device attached via a PCI Express (PCIe) bus. NVMe, as a logical-device interface, has been designed to capitalize on the low latency and internal parallelism of solid-state storage devices. When NVMe is used to access a non-volatile storage device included in a Solid-State Drive (SSD), the SSD may be referred to as an NVMe SSD.

An abort command may be used to abort a target command for the NVMe SSD. When the NVMe SSD receives an abort command, the NVMe SSD will wait for a specific number of commands or for a specific amount of time. After waiting for the specified number of commands or the specific amount of time, if the target command to be aborted has not been received in the NVMe SSD, then no abort of the target command is performed in response to the abort command. Furthermore, there is no mechanism to abort a target command that is still in a host Input/Output (I/O) submission queue and has not been fetched by the NVMe SSD. Consequently, this procedure leads to uncertainty in performing an abort operation of the target command.

SUMMARY

In an embodiment, the present disclosure relates to a method for aborting a command in Peripheral Component Interconnect express (PCIe) based Non-Volatile Memory express (NVMe) Solid-State Drive (SSD). The method includes receiving an abort command in an Admin submission queue of a host to abort a target command present in an Input/output (I/O) submission queue of the host or an I/O queue of the NVMe SSD and updating a tail doorbell of NVMe doorbell registers of the NVMe SSD after receiving the abort command in the Admin submission queue. The abort command includes slot information of the target command to be aborted. Thereafter, the method includes placing the abort command into an Admin queue of the NVMe SSD after updating the tail doorbell of the NVMe doorbell registers by the host and executing the abort command using the slot information of the target command to be aborted by updating an I/O completion queue of the host with the target command to be aborted. Subsequently, the method includes updating a head doorbell of the doorbell registers of the NVMe SSD after completing execution of the abort command by the NVMe SSD and updating a response for the abort command in an Admin completion queue of the host upon completion of aborting of the target command in the NVMe SSD.

In an embodiment, the present disclosure relates to a system for aborting a command in Peripheral Component Interconnect express (PCIe) based Non-Volatile Memory express (NVMe) Solid-State Drive (SSD). The system includes a processor, and a memory communicatively coupled to the processor. The memory stores processor-executable instructions, which on execution, cause the processor to receive an abort command in an Admin submission queue of a host to abort a target command present in an Input/Output (I/O) submission queue of the host or an I/O queue of the NVMe SSD and update a tail doorbell of NVMe doorbell registers of the NVMe SSD after receiving the abort command in the Admin submission queue. The abort command includes slot information of the target command to be aborted. Thereafter, the system is configured to place the abort command into an Admin queue of the NVMe SSD after updating the tail doorbell of the NVMe doorbell registers by the host and execute the abort command using the slot information of the target command to be aborted by updating an I/O completion queue of the host with the target command to be aborted. In a subsequent step, the system is configured to update a head doorbell of the doorbell registers of the NVMe SSD after completing execution of the abort command by the NVMe SSD and update a response for the abort command in an Admin completion queue of the host upon completion of aborting of the target command in the NVMe SSD.

In an embodiment, the present disclosure relates to a method for aborting a command in Peripheral Component Interconnect express (PCIe) based Non-Volatile Memory express (NVMe) Solid-State Drive (SSD). The method includes a host receiving an abort command in an Admin submission queue of the host to abort a target command scheduled to be performed on the NVMe SSD, where the abort command includes information indicating whether the target command is located in a first queue of the host or a second queue of the NVMe SSD. The method further includes the host updating a first register of the NVMe SSD after receiving the abort command in the Admin submission queue, the NVMe SSD placing the abort command into an Admin queue of the NVMe SSD after determining that the first register has been updated, the NVMe SSD determining a selected queue among the first and second queues from the information, and the NVMe SSD executing the abort command by updating an input/output (I/O) completion queue of the host to indicate the target command of the selected queue has been aborted.

BRIEF DESCRIPTION OF THE DRAWINGS

The embodiments of the disclosure are illustrated in the accompanying drawings, throughout which like reference letters indicate corresponding parts in the various figures. The embodiments herein will be better understood from the following description with reference to the drawings, in which.

DETAILED DESCRIPTION OF THE EMBODIMENTS

Figure 1A:
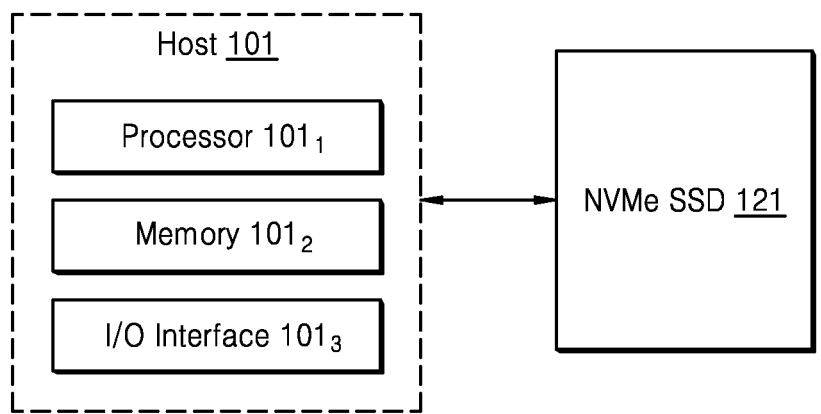
FIG. 1a shows an exemplary environment for aborting a command for PCIe based NVMe SSD in accordance with an exemplary embodiment of the present disclosure.

While the disclosure is susceptible to various modifications and alternative forms, specific embodiments thereof have been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

FIG. 1a shows an exemplary environment for aborting a command for a PCIe based NVMe SSD in accordance with an embodiment of the present disclosure.

The environment for performing an abort command for PCIe based NVMe SSD includes a host 101 (e.g., a host device) and a NVMe SSD 121 as shown in FIG. 1a. The host 101 may, also, be referred as a host central processing unit (CPU). In one embodiment, the host 101 referred to here may be a standalone computer or a laptop including a CPU with a PCIe slot, standard I/O device and memory and the NVMe SSD 121 may be connected to the host 101 through a PCIe slot. In another embodiment, the host 101 may be a server class machine including multiple CPUs and multiple PCIe slots, a standard I/O device and memory and the NVMe SSD121 may be connected to the host 101 through one of the PCIe slots. The NVMe SSD 121 may, also, be referred as a target device or a device or a PCIe based NVMe SSD. The host 101 may be communicatively coupled to the NVMe SSD 121. The host 101 may include a processor $101_1$, a memory $101_2$ and an I/O interface $101_3$. The I/O interface $101_3$ may be configured to communicate commands and/or data with the NVMe SSD 121. The commands and/or data received by the I/O interface $101_3$ may be stored in the memory $101_2$. The memory $101_2$ may be communicatively coupled to the processor $101_1$ of the host 101. The memory $101_2$ may, also, store processor instructions which may cause the processor $101_1$ to execute instructions for aborting a command in the PCIe based NVMe SSD 121 (e.g., a command issued for the PCIe based NVMe SSD 121). The processor $101_1$ may include at least one data processor for aborting a command in the PCIe based NVMe SSD 121.

Figure 1B:
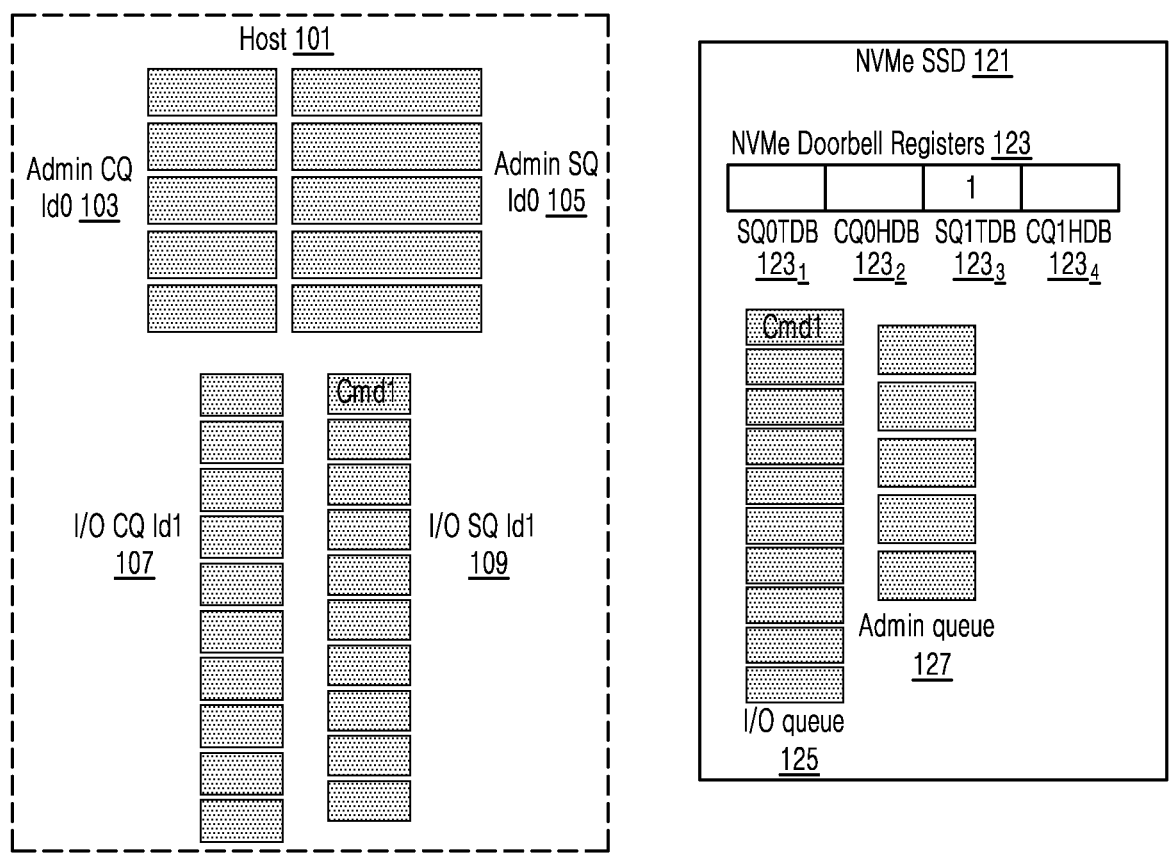
FIGS. 1b-1h show diagrams illustrating an exemplary operation for aborting a command for PCIe based NVMe SSD in accordance with an exemplary embodiment of the present disclosure.

FIGS. 1b-1h show diagrams illustrating an exemplary operation for aborting a command for a PCIe based NVMe SSD in accordance with an embodiment of the present disclosure. With reference to FIG. 1b, the host 101 may include an Admin Completion Queue (CQ), namely Admin CQ Id0 103. The host 101 may further include an Admin Submission Queue (SQ), namely Admin SQ Id0 105. The host 101 may additionally include an Input/Output Completion Queue (I/O CQ), namely I/O CQ Id1 107. Further, the host 101 may include an Input/Output Submission Queue (I/O SQ), namely I/O SQ Id1 109. The NVMe SSD 121 may include NVMe Doorbell Registers 123, an I/O queue 125 and an Admin queue 127. The NVMe Doorbell Registers 123 may include 4 registers: namely a Submission Queue 0 Tail DoorBell (SQ0TDB $123_1$), a Completion Queue 0 Head DoorBell (CQ0HDB $123_2$), a Submission Queue 1 Tail DoorBell (SQ1TDB $123_3$), and a Completion Queue 1 Head DoorBell (CQ1HDB $123_4$).

Hereafter, an operation for aborting a command for a PCIe based NVMe SSD in accordance with an embodiment of the disclosure is explained below with reference to FIGS. 1a-1g. In the embodiment, the command to be aborted is present in the I/O SQ (e.g., I/O SQ Id1 109) of the host 101.

Figure 1C:
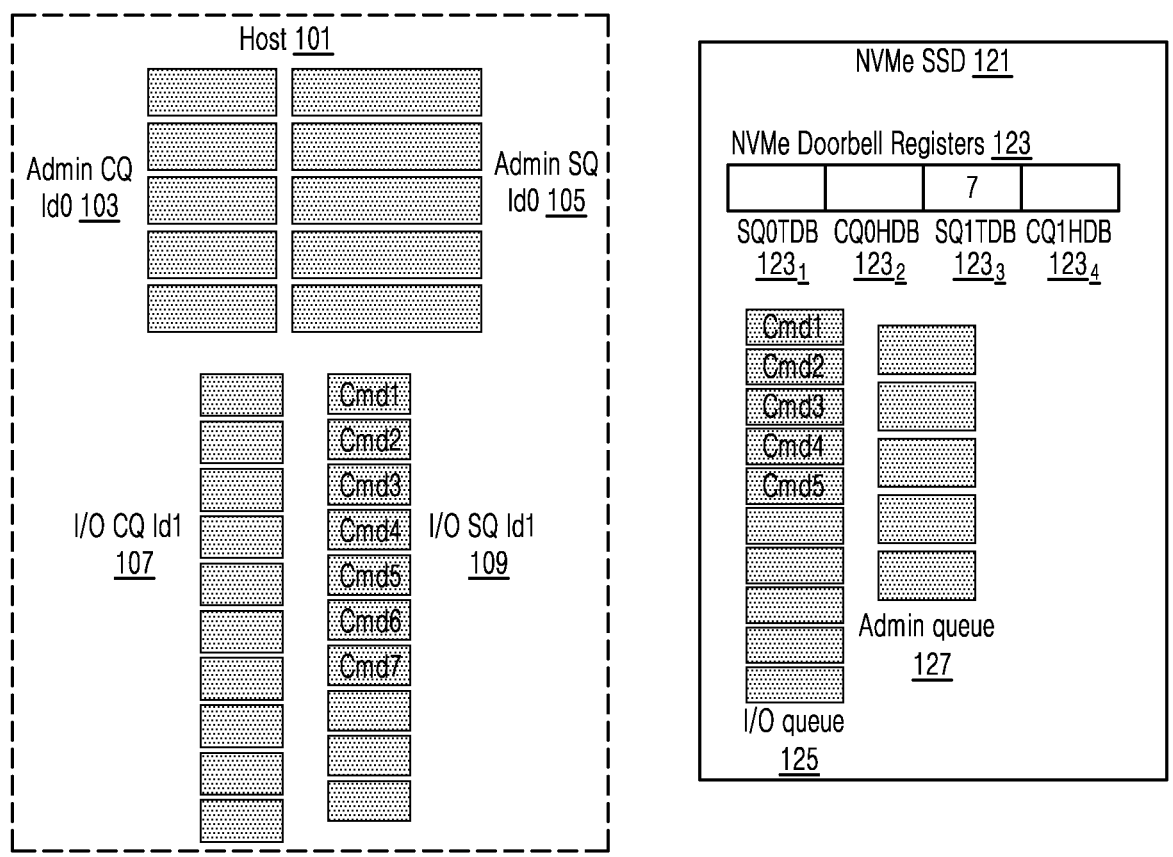
Figure 1D:
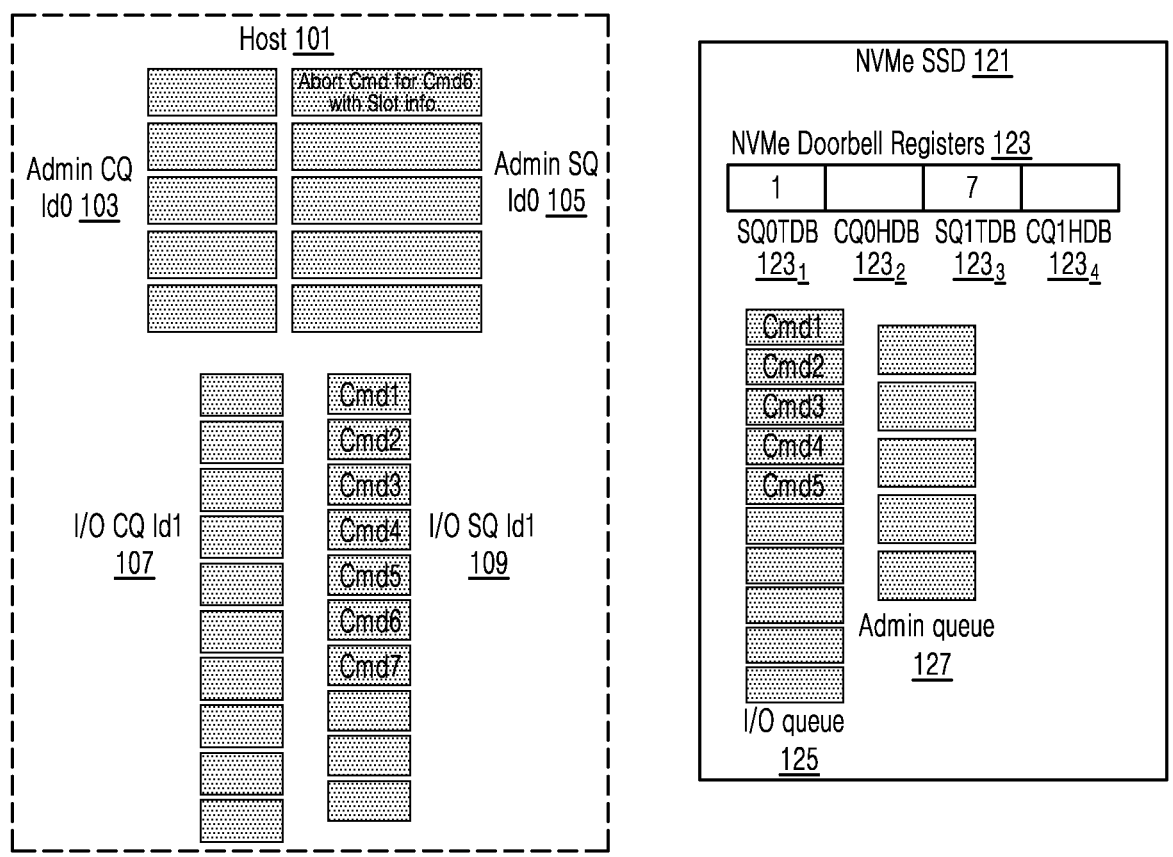

When the host 101 receives a command (e.g., Cmd1) for execution from a user, the host 101 places the command Cmd1 in the I/O SQ Id1 109 of the host 101 as shown in FIG. 1b. In a subsequent step, the host 101 updates the SQ1TDB $123_3$ of the NVMe Doorbell Registers 123 present in the NVMe SSD 121 to 1 as shown in FIG. 1b. The updating of the SQ1TDB $123_3$ is an indication to the NVMe SSD 121 that there is one command to be executed. Thereafter, the NVMe SSD 121 fetches the command Cmd1 into the I/O queue 125 for execution. For example, the NVMe SSD 121 may extract the command Cmd1 from the I/O SQ Id1 109 and place the extracted command into the I/O queue 125. There may be more commands, say Cmd2 to Cmd7, that may be received by the host 101 for execution from the user, as shown in FIG. 1c. The host 101 receives the commands Cmd2 to Cmd7 after Cmd1 and places the received commands in the I/O SQ Id1 109 of the host 101 as shown in FIG. 1c. In a next step, the host 101 updates the SQ1TDB $123_3$ of the NVMe Doorbell Registers 123 present in the NVMe SSD 121 from 1 to 7. The updating of the SQ1TDB $123_3$ is an indication to the NVMe SSD 121 that there are 7 commands in total to be executed. Thereafter, the NVMe SSD 121 fetches the commands Cmd2 to Cmd5 into the I/O queue 125 for execution as shown in FIG. 1c. At this stage, the host 101 may receive an abort command in an Admin submission queue 105 to abort a target command in an I/O submission queue 109 of the host 101. In detail, the host 101 may receive an abort command from the user in the Admin SQ Id0 105 to abort a target command (e.g., Cmd6) in the I/O SQ Id1 109 of the host 101, as shown in FIG. 1d. In an embodiment, the abort command includes slot information of the target command to be aborted. In this case, the abort command includes slot information of the target command Cmd6 to be aborted. In an embodiment, the slot information includes a slot index of the I/O submission queue (e.g., the I/O SQ Id1 109) of the host 101 where the target command Cmd6 to be aborted is placed in the I/O submission queue (e.g., I/O SQ Id1 109) of the host 101. For example, suppose I/O SQ Id1 109 of the host 101 has 100 slots to submit commands and Cmd1 resides in Slot 11 of the I/O SQ Id1 109, Cmd2 resides in Slot 12 of the I/O SQ Id1 109, Cmd3 resides in Slot 13, Cmd4 resides in Slot 14, Cmd5 resides in Slot 15 and Cmd6 resides in Slot 16. If Cmd6 is the target command (i.e., I/O SQ Id1 109 Cmd Id) to be aborted which is in I/O SQ Id1 109 of the host 101, then the abort command includes slot information (i.e., slot 16) of the I/O SQ Id1 109 Cmd Id (i.e., Cmd 6). For example, the slot information may be a numerical value that indicates a location within the I/O submission queue of the target command to abort or cancel. Thereafter, the host 101 updates a tail doorbell of NVMe doorbell registers 123 of the NVMe SSD 121 after receiving the abort command in the Admin submission queue. In detail, the host 101 updates the SQ0TDB $123_1$ of the NVMe Doorbell Registers 123 of the NVMe SSD 121 after the host 101 receives the abort command in the Admin SQ $Id_0$ 105 as shown in FIG. 1d. For example, the '1' in the SQ0TDB $123_1$ may indicate that one command is to be aborted.

Figure 1E:
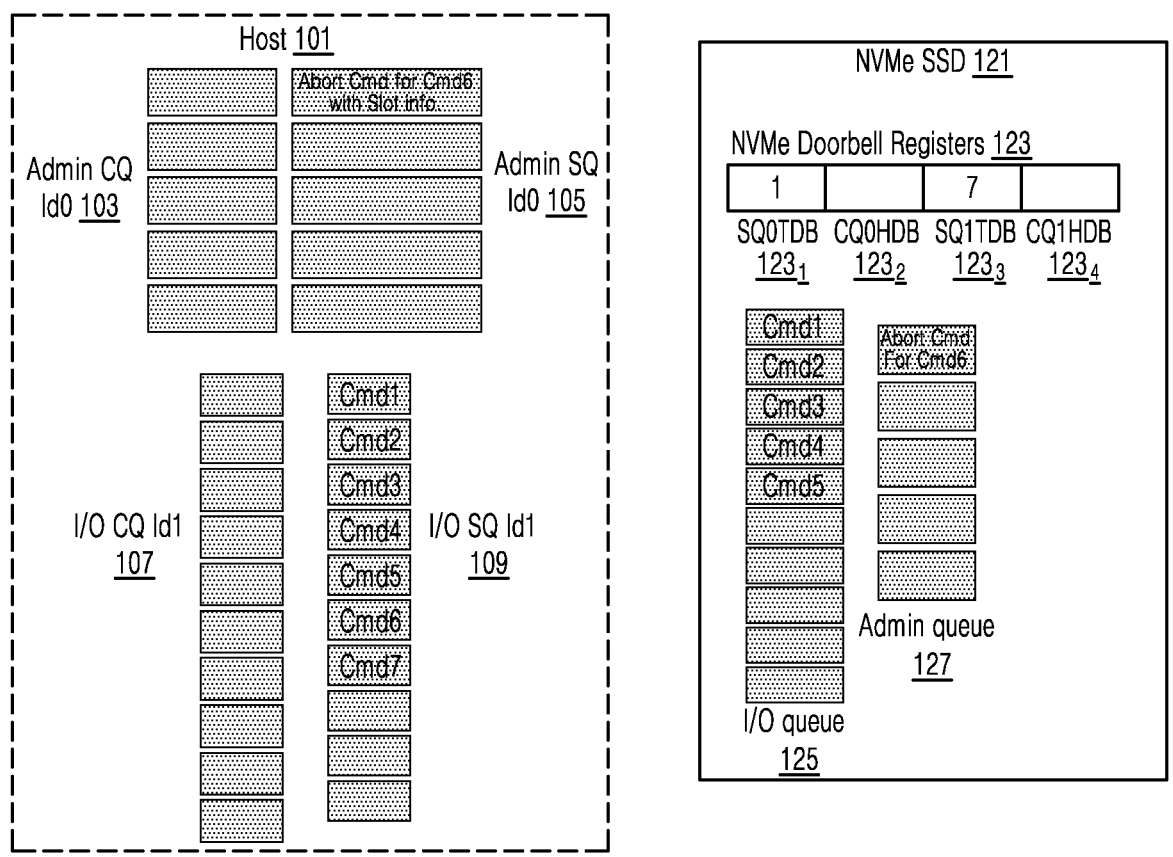
Figure 1F:
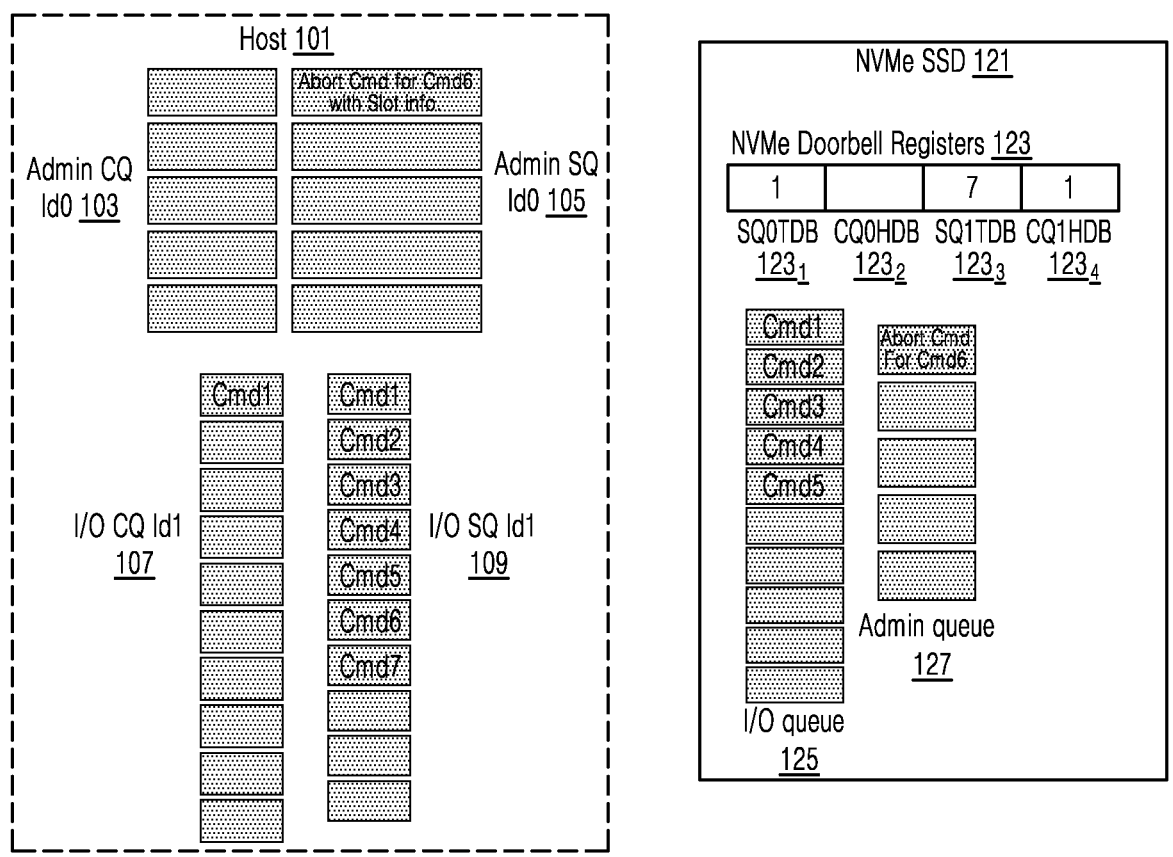
Figure 1G:
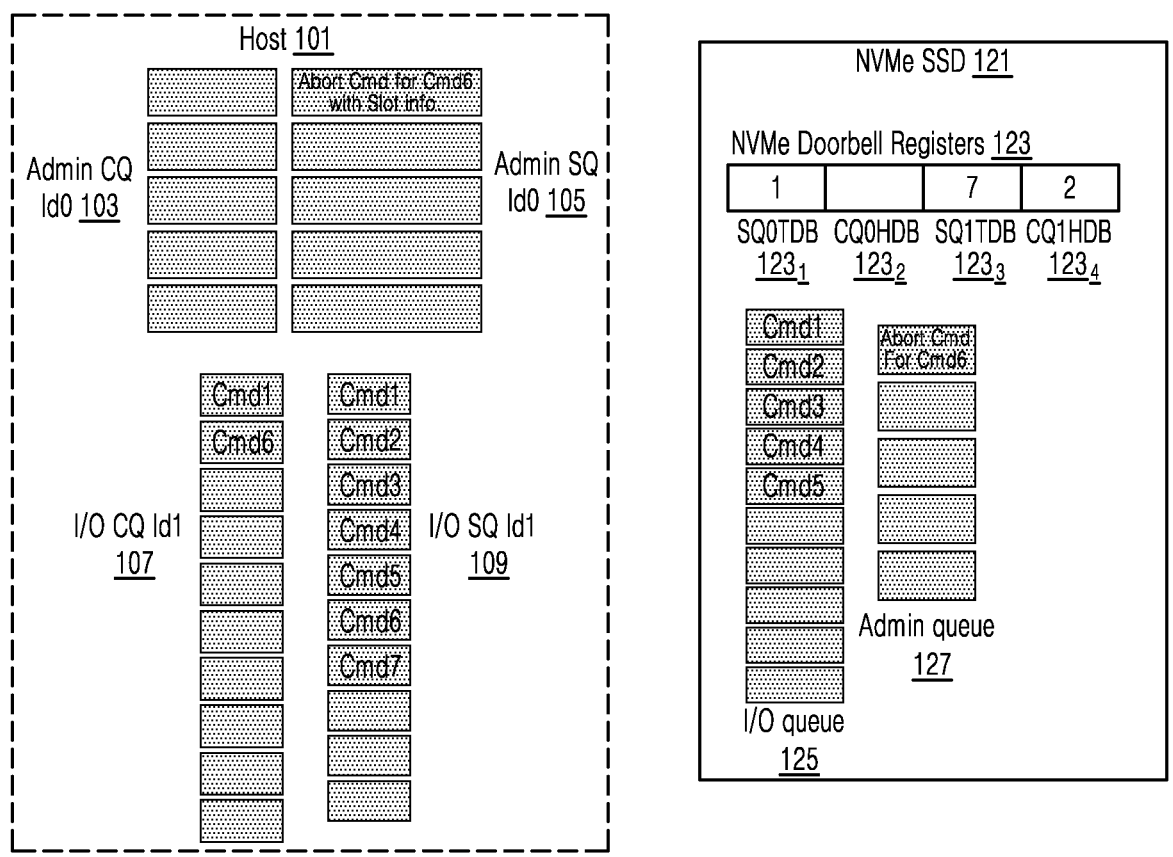
Figure 1H:
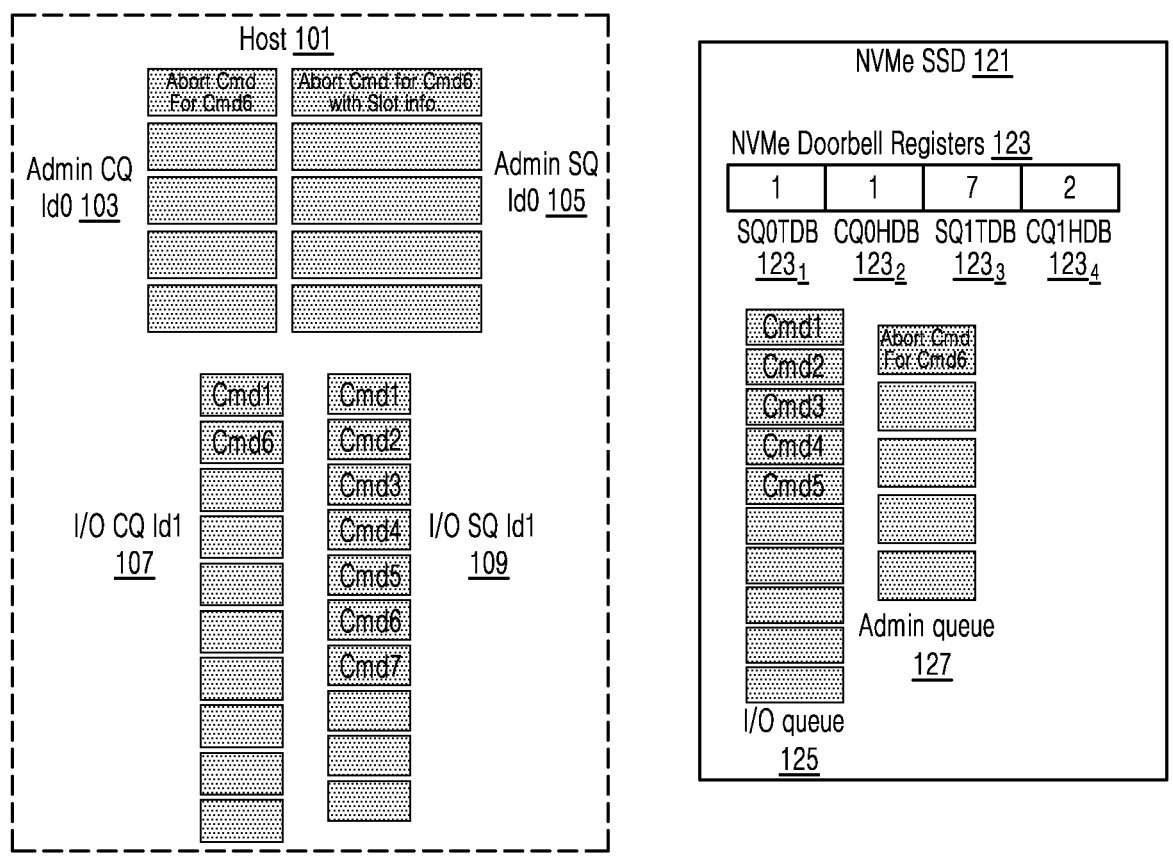

In a next step, the NVMe SSD 121 fetches/receives the abort command in the Admin queue 127 of the NVMe SSD 121 after the host 101 updates the tail doorbell of the NVMe doorbell registers 123. In detail, the NVMe SSD 121 places the abort command into the Admin queue 127 of the NVMe SSD 121 after determining that the SQ00TDB $123_1$ of the NVMe Doorbell Registers 123 has been updated to 1 by the host 101 as shown in FIG. 1e. Prior to executing the abort command using the slot information of the target command, the NVMe SSD 121 may complete execution of an I/O command which is being executed currently. For instance, in this case, the NVMe SSD 121 completes execution of command Cmd1 which is being executed currently before executing the abort command. Thereafter, the NVMe SSD 121 updates the I/O completion queue of the host 101 upon completion of the I/O command in the NVMe SSD 121. In detail, the NVMe SSD 121 updates the I/O CQ Id1 107 of the host 101 upon completion of the Cmd1 in the NVMe SSD 121 as shown in FIG. 1f. For example, the I/O CQ Id1 107 may indicate that the first command Cmd1 has been completed by the NVMe SSD 121. In a next step, the host 101 updates the head doorbell of the NVMe doorbell registers 123 of the NVMe SSD 121 after the completion of the I/O command. In detail, after the completion of Cmd1, the host 101 updates the CQ1HDB $123_4$ of NVMe Doorbell Registers 123 of the NVMe SSD 121 to 1 as shown in FIG. 1f. Once the NVMe SSD 121 completes execution of an ongoing I/O command, the NVMe SSD 121 proceeds to execute the abort command. In a situation when the NVMe SSD 121 is not executing any I/O command, the NVMe SSD 121 proceeds to execute the abort command on receipt of the abort command. The NVMe SSD 121 executes the abort command using the slot information of the target command (e.g., Cmd6) to be aborted by updating an I/O completion queue (e.g., I/O CQ Id1 107) of the host 101 with the target command (e.g., Cmd6) to be aborted as shown in FIG. 1g. The host 101 updates the head doorbell of NVMe doorbell registers 123 of the NVMe SSD 121 after execution of the abort command by the NVMe SSD 121 has completed. In detail, the host 101 updates the CQ1HDB $123_4$ of the NVMe Doorbell Registers 123 of the NVMe SSD 121 from 1 to 2 after execution of the abort command by the NVMe SSD 121 has completed as shown in FIG. 1g. For example, the host 101 may update the CQ1HDB $123_4$ of the NVMe Doorbell Registers 123 of the NVMe SSD 121 from 1 to 2 upon determining that the target command to be aborted has been placed in I/O CQ Id1 107. Thereafter, the NVMe SSD 121 updates a response for the abort command in an Admin completion queue of the host 101 upon completion of aborting of the target command in the NVMe SSD 121. In detail, the NVMe SSD 121 places information indicating completion of the abort command in the Admin CQ $Id_0$ 103 of the host 101 upon completion of aborting of the Cmd6 in the NVMe SSD 121 as shown in FIG. 1h. In an embodiment, updating the response for the abort command may comprise setting a slot of the Admin CQ $Id_0$ 103 associated with the abort command to indicate that the target command (e.g., Cmd6) has been aborted. Subsequently, the host 101 updates the head doorbell of the NVMe doorbell registers 123 of the NVMe SSD 121 after the host 101 receives the information indicating completion of the abort command in the Admin completion queue. In detail, the Host 101 updates the CQ0HDB $123_2$ of the NVMe Doorbell Registers 123 of the NVMe SSD 121 to 1 after the host 101 receives the abort command in the Admin CQ $Id_0$ 103 as shown in FIG. 1h.

This completes the operation for aborting the command Cmd6. After the abort command is executed on priority, the NVMe SSD 121 continues with the execution of commands Cmd2 to Cmd5 and then Cmd7 in a similar way as explained above for execution of the command Cmd1. For example, if another I/O command (e.g., Cmd2) is scheduled to be performed next while the abort command is received (e.g., Cmd2 is scheduled to be performed immediately after Cmd1 while the abort command is received), but has not currently started to be executed, execution of this other I/O command can be delayed until the abort command has completed.

FIGS. 2a-2f show diagrams illustrating an exemplary operation for aborting a command for PCIe based NVMe SSD in accordance with an embodiment of the present disclosure.

The environment for performing an abort command for a PCIe based NVMe SSD as per this embodiment is the same as the environment shown in FIG. 1a, which includes the host 101 and the NVMe SSD 121. The host 101 may, also, be referred as a host CPU. In one embodiment, the host 101 referred here may be a standalone computer or a laptop with a CPU including a PCIe slot, standard I/O device and memory and the NVMe SSD 121 may be connected to the host 101 through a PCIe slot. In another embodiment, the host 101 may be a server class machine with multiple CPUs and multiple PCIe slots, standard I/O device and memory and the NVMe SSD 121 may be connected to the host 101 through one of the PCIe slots. The NVMe SSD 121 may, also, be referred as a target device or a device or a PCIe based NVMe SSD. The host 101 may be communicatively coupled to the NVMe SSD 121. The host 101 may include a processor $101_1$, a memory $101_2$ and an I/O interface $101_3$. The I/O interface $101_3$ may be configured to communicate commands and/or data with the NVMe SSD 121. The commands and/or data received by the I/O interface $101_3$ may be stored in the memory $101_2$. The memory $101_2$ may be communicatively coupled to the processor $101_1$ of the host 101. The memory $101_2$ may, also, store processor instructions which may cause the processor $101_1$ to execute the instructions for aborting a command in the PCIe based NVMe SSD 121. The processor $101_1$ may include at least one data processor for aborting a command for PCIe based NVMe SSD 121. The processor $101_1$ may include specialized processing units such as integrated system (bus) controllers, memory management control units, floating point units, graphics processing units, digital signal processing units, etc.

Figure 2A:
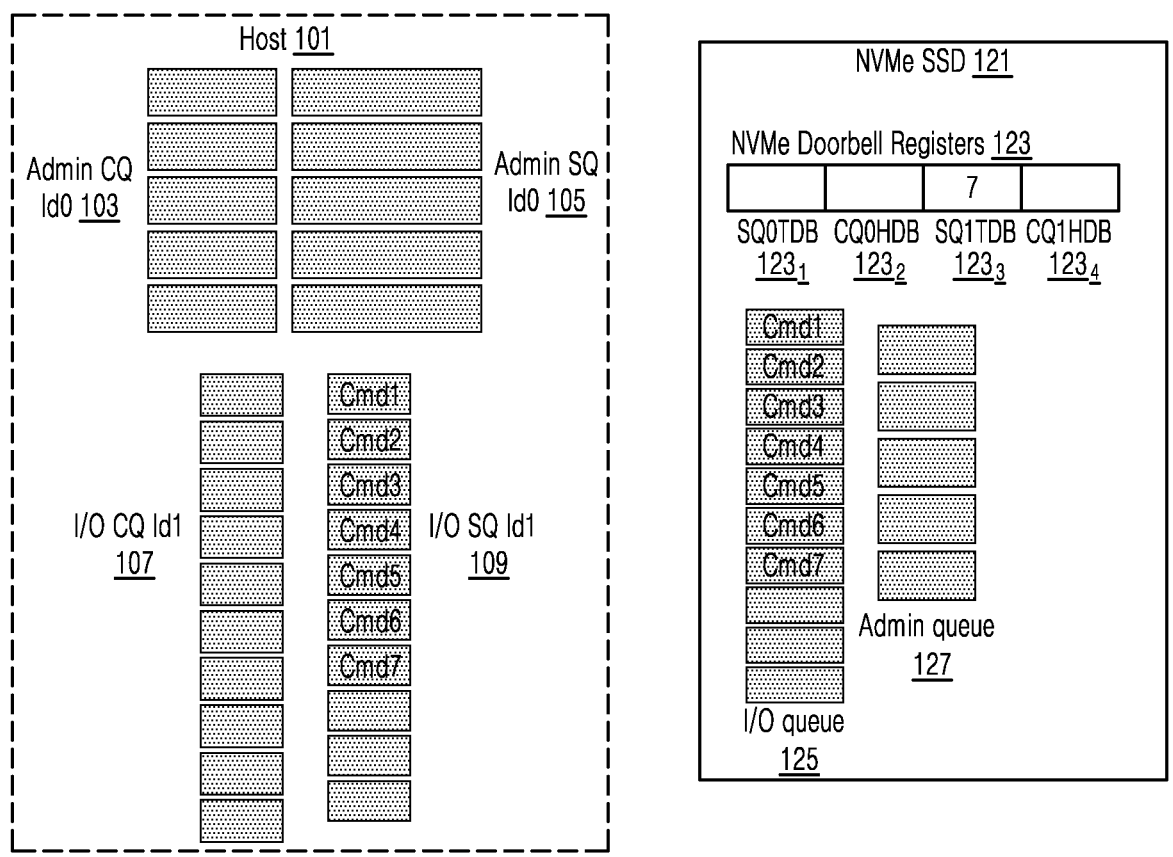
FIGS. 2a-2f show diagrams illustrating an exemplary operation for aborting a command for PCIe based NVMe SSD in accordance with an exemplary embodiment of the present disclosure.

With reference to FIG. 2a, the host 101 may include an Admin CQ $Id_0$ 103, an Admin SQ Id0 105, I/0 CQ Id1 107 and I/O SQ Id1 109. The NVMe SSD 121 may include NVMe Doorbell Registers 123, an I/O queue 125 and an Admin queue 127. The NVMe Doorbell Registers 123 may include 4 registers: SQ0TDB $123_1$, CQ0HDB $123_2$, SQ1TDB $123_3$, and CQ1HDB $123_4$.

Hereafter, an operation for aborting a command for a PCIe based NVMe SSD in accordance with an embodiment of the disclosure is explained below with reference to FIGS. 2a-2f. In this embodiment, the command to be aborted is present in the I/O queue (e.g., I/O queue 125) of the NVMe SSD 121.

Figure 2B:
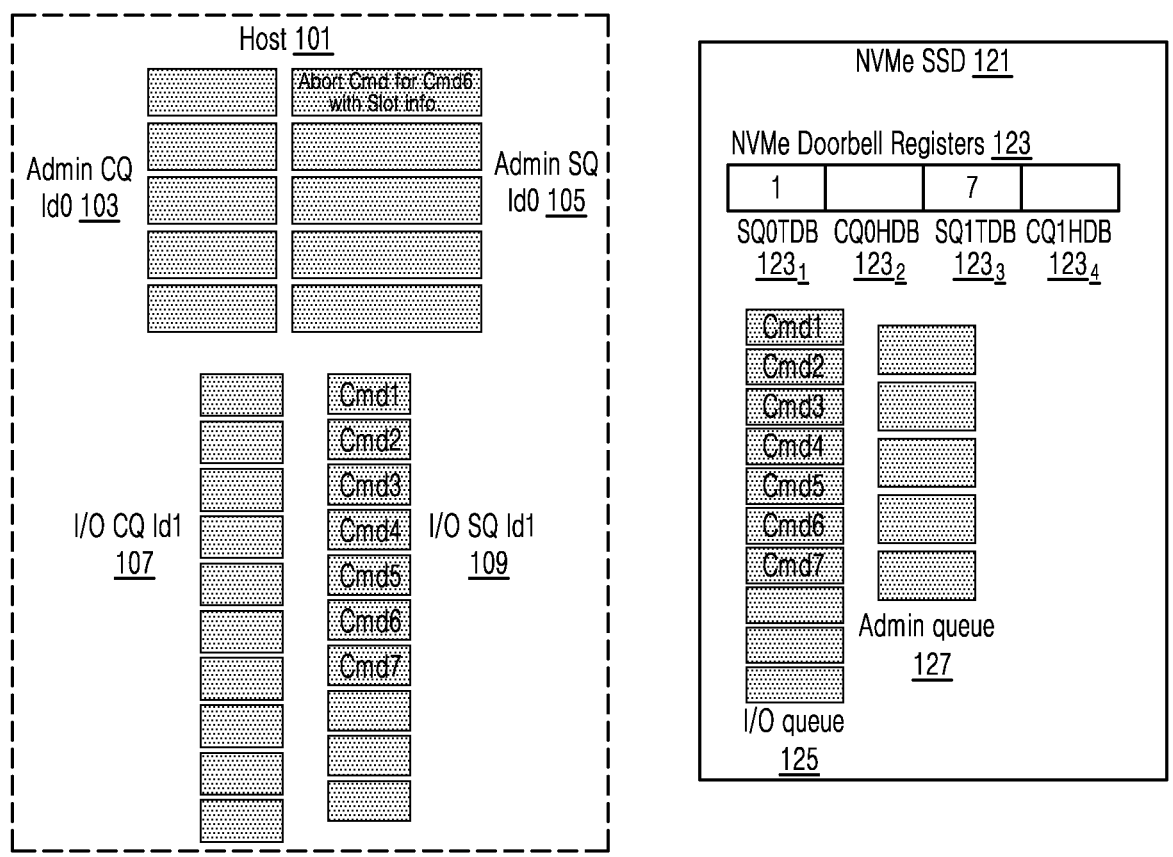

When the host 101 receives a command or commands, say Cmd1 to Cmd 7, for execution from a user, the host 101 places the commands Cmd1 to Cmd 7 in the I/O SQ Id1 109 of the host 101 as shown in FIG. 2a. In a subsequent step, the host 101 updates the SQ1TDB $123_3$ of the NVMe Doorbell Registers 123 present in the NVMe SSD 121 to 7 as shown in FIG. 2a. The updating of the SQ1TDB $123_3$ is an indication to the NVMe SSD 121 that there are seven commands to be executed. Thereafter, the NVMe SSD 121 fetches the commands Cmd1 to Cmd7 into the I/O queue 125 for execution. At this stage, the host 101 may receive an abort command in an Admin submission queue 105 to abort a target command in an I/O queue of the NVMe SSD 121, wherein the abort command includes slot information of the target command to be aborted. In detail, the host 101 may receive an abort command from the user in the Admin SQ Id0 105 to abort a target command (e.g., Cmd6) in the I/O queue 125 of the NVMe SSD 121, as shown in FIG. 2b. In an embodiment, the abort command includes slot information of the target command to be aborted. In this case, the abort command includes slot information of the target command Cmd6 to be aborted. The slot information includes a slot index of the I/O queue (e.g., the I/O queue 125) of the NVMe SSD 121 where the target command Cmd6 to be aborted is placed. For example, suppose I/O queue 125 of the NVMe SSD 121 has 100 slots to submit commands and Cmd1 resides in Slot 11 of the I/O queue 125, Cmd2 resides in Slot 12 of the I/O queue 125, Cmd3 resides in Slot 13, Cmd4 resides in Slot 14, Cmd5 resides in Slot 15 and Cmd6 resides in Slot 16. If Cmd6 is the target command (i.e., I/O queue 125 Cmd Id) to be aborted which is in I/O queue 125 of the NVMe SSD 121, then, the abort command includes slot information (i.e., slot 16) of the I/O queue 125 Cmd Id (i.e., Cmd 6). Thereafter, the host 101 updates a tail doorbell of NVMe doorbell registers 123 of the NVMe SSD 121 after receiving the abort command. In detail, the host 101 updates the SQ0TDB $123_1$ of the NVMe Doorbell Registers 123 of the NVMe SSD 121 when the host 101 receives the abort command in the Admin SQ Id0 105, as shown in FIG. 2b. For example, the host 101 may update the SQ0TDB $123_1$ to 1 to indicate that one command is to be aborted in response to determining that the Admin submission queue 105 includes an abort command.

Figure 2C:
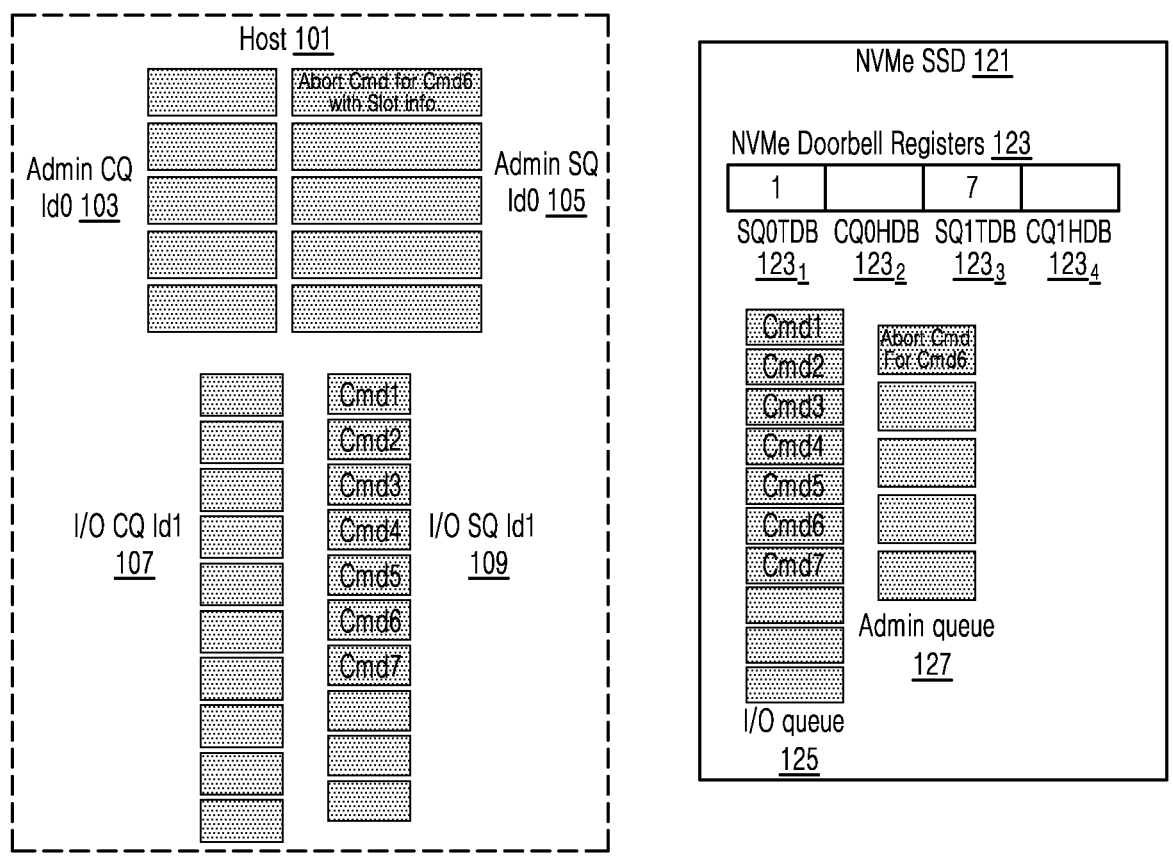
Figure 2D:
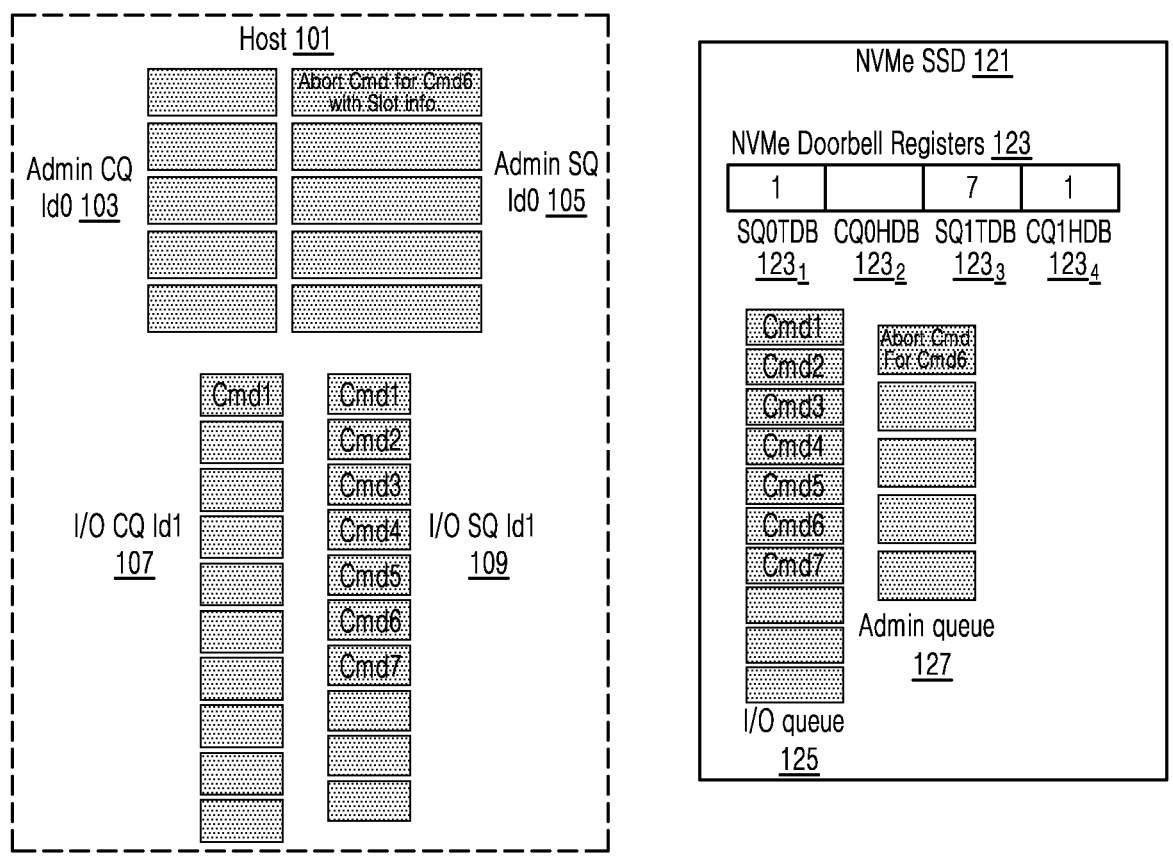
Figure 2E:
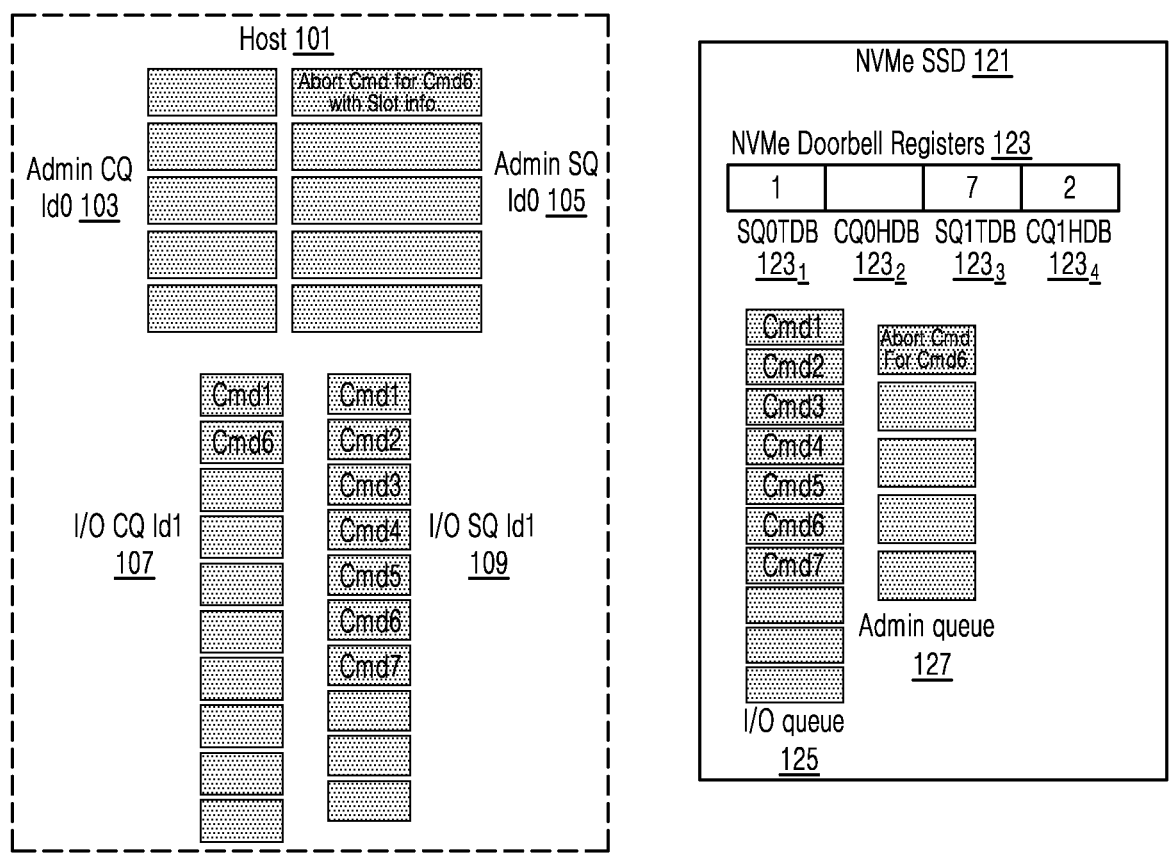
Figure 2F:
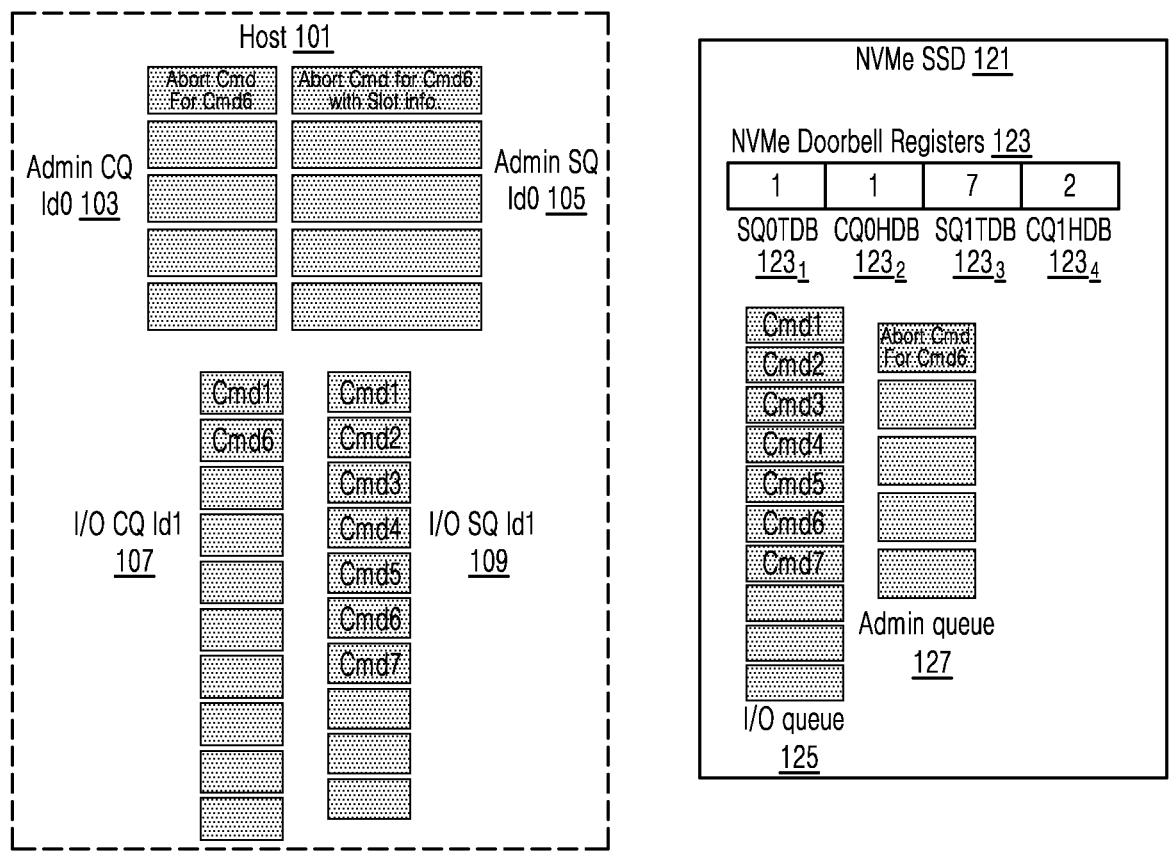

In a next step, the NVMe SSD 121 places the abort command into an Admin queue of the NVMe SSD 121 after the host 101 updates the tail doorbell of the NVMe doorbell registers 123. In detail, the NVMe SSD 121 places the abort command in Admin queue 127 of the NVMe SSD 121 after the SQ0TDB $123_1$ of the NVMe Doorbell Registers 123 has been updated to 1 by the host 101 as shown in FIG. 2C. Prior to executing the abort command using the slot information of the target command, the NVMe SSD 121 may complete execution of an I/O command which is being executed currently. For instance, in this case, the NVMe SSD 121 completes execution of command Cmd1 which is being executed currently before executing the abort command. For example, execution of the abort command may be delayed until the NVMe SSD 121 completes execution of command which is being executed currently. Thereafter, the NVMe SSD 121 updates the I/O completion queue of the host 101 upon completion of the I/O command in the NVMe SSD 121. In detail, the NVMe SSD 121 updates the I/O CQ Id1 107 of the host 101 upon completion of the Cmd1 in the NVMe SSD 121 as shown in FIG. 2d. In a next step, the host 101 updates the head doorbell of the NVMe doorbell registers 123 of the NVMe SSD 121 after the completion of I/O command. In detail, the host 101 updates the CQ1HDB $123_4$ of the NVMe Doorbell Registers 123 of the NVMe SSD 121 to 1 after the completion of Cmd1 as shown in FIG. 2d. Once the NVMe SSD 121 completes execution of ongoing I/O command, the NVMe SSD 121 proceeds to execute the abort command. In a situation when the NVMe SSD 121 is not executing any I/O command, the NVMe SSD 121 proceeds to execute the abort command on receipt of the abort command. The NVMe SSD 121 executes the abort command using the slot information of the target command (e.g., Cmd6) to be aborted by updating an I/O completion queue (e.g., I/O CQ Id1 107) of the host 101 with the target command (e.g., Cmd6) to be aborted as shown in FIG. 2e. The host 101 updates a head doorbell of the NVMe doorbell registers 123 of the NVMe SSD 121 after completing execution of the abort command by the NVMe SSD 121. In detail, the host 101 updates the CQ1HDB $123_4$ of the NVMe Doorbell Registers 123 of the NVMe SSD 121 from 1 to 2 after completing execution of Cmd6 as shown in FIG. 2e. Thereafter, the NVMe SSD 121 updates a response for the abort command in an Admin completion queue of the host 101 upon completion of aborting of the target command in the NVMe SSD 121. For example, the NVMe SSD 121 may store information in the Admin CQ Id0 103 indicating that the target command has been aborted. In detail, the NVMe SSD 121 updates the abort command in the Admin CQ Id0 103 of the host 101 upon completion of aborting of the Cmd6 in the NVMe SSD 121 as shown in FIG. 2f. Subsequently, the host 101 updates the head doorbell of the NVMe doorbell registers 123 of the NVMe SSD 121 after the host 101 determines completion of the abort command from the Admin completion queue. In detail, the host 101 updates the CQ0HDB $123_2$ of the NVMe Doorbell Registers 123 of the NVMe SSD 121 to 1 after the host 101 receives the abort command in the Admin CQ Id0 103 as shown in FIG. 2f. This completes the operation for aborting the command Cmd6. After the abort command is executed on priority, the NVMe SSD 121 continues with the execution of commands Cmd2 to Cmd5 and then Cmd7 in a similar way as explained above for execution of the command Cmd1.

Figure 3:
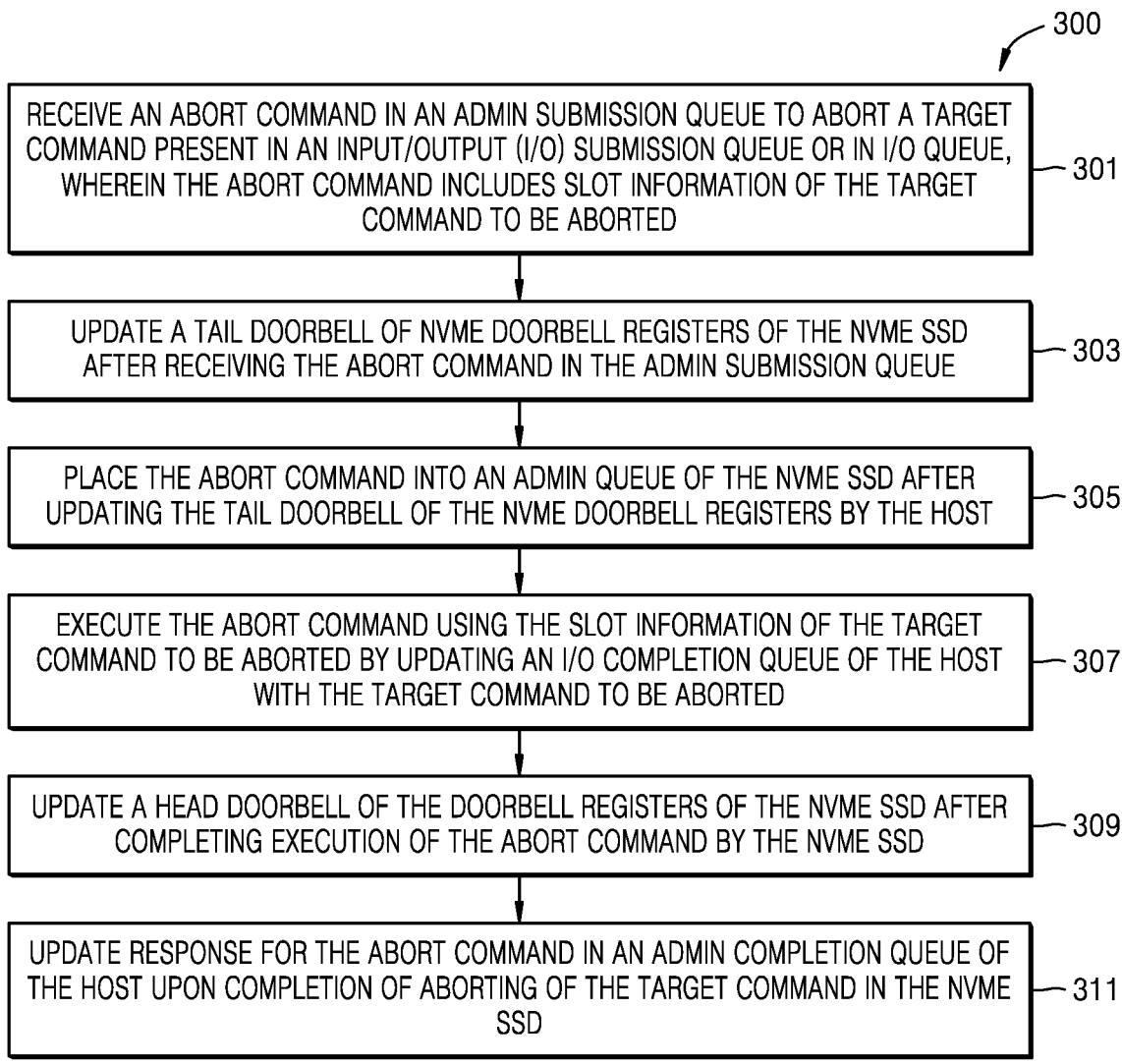
FIG. 3 illustrates a flowchart showing a method for aborting a command for PCIe based NVMe SSD in accordance with an exemplary embodiment of the present disclosure.

FIG. 3 illustrates a flowchart showing a method for aborting a command for PCIe based NVMe SSD in accordance with a first embodiment (e.g., FIGS. 1A-1H) and a second embodiment (e.g., FIGS. 2A-2F) of the present disclosure.

As illustrated in FIG. 3, the method 300 includes one or more steps for aborting a command for a PCIe based NVMe SSD in accordance with an embodiment of the present disclosure. The method 300 may be described in the general context of computer executable instructions. Generally, computer executable instructions can include routines, programs, objects, components, data structures, procedures, units, and functions, which perform particular functions or implement particular abstract data types.

The order in which the method 300 is described is not intended to be construed as a limitation, and any number of the described method steps can be combined in any order to implement the method. Additionally, individual steps may be deleted from the method without departing from the scope of the subject matter described herein. Furthermore, the method can be implemented in any suitable hardware, software, firmware, or combination thereof.

At step 301, the host 101 receives an abort command in an Admin submission queue 105 to abort a target command in an I/O submission queue 109 of the host 101 or abort a target command in an I/O queue 125 of the NVMe SSD 121 or abort a target command in an Admin queue 127 of the NVMe SSD 121. The abort command may include slot information of the target command to be aborted. The slot information may include a slot index of the I/O submission queue 109 of the host 101 where the target command to be aborted is placed or a slot index of the I/O queue 125 of the NVMe SSD 121 where the target command to be aborted is placed.

At step 303, the host 101 updates a tail doorbell (e.g., SQ0TDB $123_1$) of NVMe doorbell registers 123 of the NVMe SSD 121 after receiving the abort command in the Admin submission queue 105.

At step 305, the NVMe SSD 121 places the abort command into an Admin queue 127 of the NVMe SSD 121 after the tail doorbell (e.g., SQ0TDB 123₁) of the NVMe doorbell registers 123 is updated by the host 101.

At step 307, the NVMe SSD 121 executes the abort command using the slot information of the target command to be aborted by updating an I/O completion queue 107 of the host 101 with the target command to be aborted.

At block (e.g., step) 309, the host 101 updates a head doorbell (e.g., CQ1HDB 123₄) of the NVMe doorbell registers 123 of the NVMe SSD 121 after completing execution of the abort command by the NVMe SSD 121.

At block 311, the NVMe SSD 121 updates a response for the abort command in an Admin completion queue 103 of the host 101 upon completion of aborting of the target command in the NVMe SSD 121.

The use of the slot index in the present disclosure allows a target command to be aborted immediately after receiving the abort command when the target command is in the NVMe SSD or is still in the host. This approach may reduce abort response time significantly.

Typically, when the NVMe SSD receives an abort command, the NVMe SSD will wait for a specific number of commands or for a specific amount of time. After waiting for the specified number of commands or the specific amount of time, if the target command to be aborted is not received in the NVMe SSD, then the target command is not aborted. So, there is no guarantee that the abort command will be executed. However, in at least one embodiment of the present disclosure, a device can determine the existence of the target command using the slot index when the abort command is received. As a result, at least one embodiment of the NVMe SSD guarantees an abort operation of the target command and at least one embodiment of the method of the present disclosure guarantees consistency of a response time for an abort command.

Due to the slot index, a look-up method for a target command may be optimized. Hence, an abort command implementation in an NVMe SSD as provided in the present disclosure is very useful.

Herein and above, the terms "a", "an" and "the" mean "one or more", unless expressly specified otherwise.

A description of an embodiment above with several components in communication with each other does not imply that all such components are required. On the contrary, a variety of optional components are described to illustrate a wide variety of possible embodiments of the disclosure.

When a single device or article is described herein or above, it will be readily apparent that more than one device/article (whether or not they cooperate) may be used in place of a single device/article. Similarly, where more than one device or article is described herein or above (whether or not they cooperate), it will be readily apparent that a single device/article may be used in place of the more than one device or article, or a different number of devices/articles may be used instead of the shown number of devices or article. The functionality and/or the features of a device described herein or above may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the scope and spirit being indicated by the following claims.

What is claimed is:

1. A method for aborting a command for a Peripheral Component Interconnect express (PCIe) based Non-Volatile Memory express (NVMe) Solid-State Drive (SSD), the method comprising:
   receiving, by a host, an abort command in an Admin submission queue of the host to abort a target command present in an Input/Output (I/O) submission queue of the host or in an I/O queue of the NVMe SSD, wherein the abort command comprises slot information of the target command to be aborted;
   updating, by the host, a tail doorbell of NVMe doorbell registers of the NVMe SSD after receiving the abort command in the Admin submission queue;
   placing, by the NVMe SSD, the abort command into an Admin queue of the NVMe SSD after updating the tail doorbell of the NVMe doorbell registers by the host;
   executing, by the NVMe SSD, the abort command, wherein the executing comprises:
      determining, by the NVMe SSD, whether the target command has been received in the NVMe SSD;
      aborting, by the NVMe SSD, the target command in response to determining that the target command has been received in the NVMe SSD;
      using the slot information of the target command to be aborted for updating an I/O completion queue of the host with the target command to be aborted in response to determining that the target command has not been received;
   updating, by the host, a head doorbell of the NVMe doorbell registers of the NVMe SSD after completing execution of the abort command by the NVMe SSD; and
   placing, by the NVMe SSD, information in an Admin completion queue of the host after the updating of the head doorbell that indicates the aborting of the target command has completed.

2. The method of claim 1, wherein the slot information comprises slot index of the I/O submission queue of the host where the target command to be aborted is placed.

3. The method of claim 1, wherein the slot information comprises slot index of the I/O queue of the NVMe SSD where the target command to be aborted is placed.

4. The method of claim 1, further comprising:
updating, by the host, the head doorbell of the NVMe doorbell registers of the NVMe SSD after the host determines from the Admin completion queue that the abort command has completed.

5. The method of claim 1, wherein prior to executing the abort command the method comprises:
completing, by the NVMe SSD, execution of a I/O command prior to executing the abort command when the I/O command is currently being executed;
updating, by the NVMe SSD, the I/O completion queue of the host upon completion of the I/O command in the NVMe SSD; and
updating, by the host, the head doorbell of the NVMe doorbell registers of the NVMe SSD after the completion of the I/O command.

6. A system for aborting a command for a Peripheral Component Interconnect express (PCIe) based Non-Volatile Memory express (NVMe) Solid-State Drive (SSD), the system comprising:
a processor; and
a memory communicatively coupled to the processor, wherein the memory stores processor-executable instructions, which on execution, cause the processor to:
receive an abort command in an Admin submission queue of a host to abort a target command in an Input/Output (I/O) submission queue of the host or in an I/O queue of the NVMe SSD, wherein the abort command comprises slot information of the target command to be aborted;
update a tail doorbell of NVMe doorbell registers of the NVMe SSD after receiving the abort command in the Admin submission queue;
place the abort command into an Admin queue of the NVMe SSD after updating the tail doorbell of the NVMe doorbell registers by the host;
execute the abort command, wherein the execute comprises:
determining whether the target command has been received in the NVMe SSD;
aborting the target command in response to determining that the target command has been received in the NVMe SSD;
using the slot information of the target command to be aborted for updating an I/O completion queue of the host with the target command to be aborted in response to determining that the target command has not been received;
update a head doorbell of the NVMe doorbell registers of the NVMe SSD after completing execution of the abort command; and
placing information in an Admin completion queue of the host after the update of the head doorbell that indicates the aborting of the target command has completed.

7. The system as claimed in claim 6, wherein the slot information comprises slot index of the I/O submission queue of the host.

8. The system of claim 6, wherein the slot information comprises a slot index of the I/O queue of the NVMe SSD where the target command to be aborted is placed.

9. The system of claim 6 is configured to:
update the head doorbell of the NVMe doorbell registers of the NVMe SSD after the host determines from the Admin completion queue that the abort command has completed.

10. The system of claim 6 is configured to:
complete execution of a I/O command prior to executing the abort command when the I/O command is currently being executed;
update the I/O completion queue of the host upon completion of the I/O command in the NVMe SSD; and
update the head doorbell of the NVMe doorbell registers of the NVMe SSD after the completion of the I/O command.

11. A method for aborting a command for a Peripheral Component Interconnect express (PCIe) based Non-Volatile Memory express (NVMe) Solid-State Drive (SSD), the method comprising:
receiving, by a host, an abort command in an Admin submission queue of the host to abort a target command scheduled to be performed on the NVMe SSD, wherein the abort command comprises information indicating whether the target command is located in a first queue of the host or a second queue of the NVMe SSD;
updating, by the host, a first register of the NVMe SSD after receiving the abort command in the Admin submission queue;
placing, by the NVMe SSD, the abort command into an Admin queue of the NVMe SSD after determining that the first register has been updated;
determining, by the NVMe SSD, a selected queue among the first and second queues from the information;
executing, by the NVMe SSD, the abort command, where the executing comprises:
aborting, by the NVMe SSD, the target command in response to determining the selected queue is the second queue;
updating an input/output (I/O) completion queue of the host to indicate the target command of the selected queue has been completed in response to determining the selected queue is the first queue;
updating, by the host, a head doorbell of NVMe doorbell registers of the NVMe SSD after completing execution of the abort command by the NVMe SSD; and
placing, by the NVMe SSD, information in an Admin completion queue of the host after the updating of the head doorbell that indicates the aborting of the target command has completed.

12. The method of claim 11, further comprising updating, by the host, a second register of the NVMe SSD after determining from the I/O completion queue that execution of the target command has been aborted.

13. The method of claim 11, wherein an I/O command scheduled to next access the NVMe SSD is delayed until execution of the abort commands command completes.

14. The method of claim 11, further comprises setting a slot of the Admin completion queue associated with the abort command to indicate that the target command has been aborted.

15. The method of claim 11, wherein the first queue is an I/O submission queue of the host.

16. The method of claim 11, wherein the second queue is an I/O queue of the NVMe SSD.

17. The method of claim 11, wherein the executing of the abort command is delayed until after an I/O command currently accessing the NVMe SSD completes.

18. The method of claim 17, further comprising the NVMe SSD updating the I/O completion queue of the host to indicate the I/O command has completed.

19. The method of claim 18, further comprising the host updating a second register of the NVMe SSD after determining from the I/O completion queue that execution of the I/O command has completed.

\* \* \* \* \*